Jan. 1, 1929.                                        1,697,362
J. K. KOSTKO
SYNCHRONOUS MOTOR
Filed March 12, 1927    2 Sheets-Sheet 1

Inventor:
Jaroslaw K. Kostko
By Chas. E. Riordan
His Attorney.

Inventor:
Jaroslaw K. Kostko
By Chas. E. ...
His Attorney.

Patented Jan. 1, 1929.

1,697,362

UNITED STATES PATENT OFFICE

JAROSLAW K. KOSTKO, OF FERGUSON, MISSOURI.

SYNCHRONOUS MOTOR.

Application filed March 12, 1927. Serial No. 174,854.

My invention relates to single or polyphase dynamo electric machines operating at synchronous speed, to the method of operating same and particularly to the construction of the secondary member of such machines, whether the latter revolves or is stationary.

My improved secondary member is preferably devoid of polar projections and is so constituted or constructed that its magnetic reluctance is not the same along all of its axes, specifically that its magnetic reluctance along one axis for each pole pair differs substantially from its magnetic reluctance along another axis for each pole pair, and my invention comprises such association of my improved secondary member with other elements of a machine operating at synchronous speed as will cause, with varying load on the machine, a relative motion between the axis of the resultant magnetic flux of the machine and the axis of the lowest magnetic reluctance of the secondary, said relative motion tending to decrease the displacement between the two axes with increasing load.

The angular displacement between the axis of the lower magnetic reluctance and the axis of the higher magnetic reluctance must be chosen in accordance with the desired results or with the type of machine with which my improved secondary member is combined. In some cases it should, for instance, amount to about 90 electrical degrees, in others to about 45 and in still others to more than 90.

In applying my invention, for example, to a synchronous motor, I provide the machine with my improved form of secondary member and so locate an "exciting" winding or "exciting" windings thereon as to enable me to produce a unidirectional magnetization on the secondary the axis of which magnetization is displaced from the axis of the lower reluctance of the secondary at or near no-load. In this way I can, among other things, prevent the out-of-phase component of the current taken by the motor from varying unduly when the motor load varies, without being obliged to adjust the magnitude of the secondary unidirectional magnetization of the machine.

In applying my invention to a generator, for instance to a machine doing duty as an "exciter" for a synchronous machine, and whether said exciter is embodied in the synchronous machine or is external thereto, I embody my improved secondary in said exciter, cause the axis of the resultant magnetization in said exciter to change its space relation with respect to the axis of the lower reluctance of the secondary of the exciter when the load on the synchronous machine changes and cause this change in the space relation of the said exciter axes to vary the terminal voltage and therefore the output of the exciter, preferably causing same to increase with increasing load on the synchronous machine. Under these conditions this exciter operates as a generator supplying variable current and voltage to the motor while running at synchronous speed. This exciter carries variable load at synchronous speed and the reluctance offered by its secondary member to the passage of its resultant magnetic flux decreases with increasing exciting watt output or load. By this means I can, for instance, control the out-of-phase current component taken by a synchronous motor at different loads.

It will be understood that the elements of this so-called "exciter" may concurrently perform other duties, they may concurrently act to produce alternating currents or to produce motive power whether the "exciter" in question is embodied in the synchronous machine which it "excites" or is external thereto. But in speaking of the load on the "exciter" reference is here had to its D. C. watt output only and it is to be understood that other loads which this "exciter" may carry may considerably exceed its exciting watt load.

Taking a synchronous motor as an example in further explaining the nature of my invention, the resultant magnetization in such a machine operating at synchronous speed is always the vectorial sum of the unidirectional magnetization produced on the secondary and of the armature reaction, or of that component of said reaction which is unidirectional in so far as the secondary is concerned. The magnitude of this resultant is in the main determined by the magnitude of the terminal voltage and as a first approximation this resultant may be said to be constant throughout the operation of the machine so long as the terminal voltage is constant. Theoretically, when the machine runs light and does not exert any torque the secondary magnetization can be so adjusted that the machine will take no current from the line. Under these conditions all of the resultant magnetization of the motor is supplied by the unidirectional ampereturns on the secondary and the axis of the resultant motor magnetization coincides with the axis of said ampereturns. If the secondary ampereturns are now reduced the machine will take a certain amount of lagging current producing from the primary a magnetization of same axis and direction as that produced from the secondary and of a magnitude sufficient to reestablish that value of the resultant motor magnetization which corresponds to the terminal voltage. If the secondary ampereturns are increased instead of being reduced, thus tending to increase the resultant magnetization of the machine, then the primary takes leading currents which produce a magnetization of same axis but opposite direction to that produced by the secondary, and of a magnitude sufficient to reduce the resultant magnetization of the machine to its original value.

When a synchronous motor is loaded the unidirectional magnetization produced on the secondary must be increased to take care of the primary armature reaction and if the active material of the machine is to be fully utilized. One of the main factors upon which the maximum synchronous torque of the machine depends is the maximum magnitude of this unidirectional magnetization. With maximum unidirectional magnetization on the secondary the primary usually takes a small lagging current component and the motor, therefore, operates with a somewhat lagging power factor. If the maximum unidirectional magnetization is left unaltered and the load gradually taken off the motor, then the lagging out-of-phase component taken by the primary will first decrease to zero and thereafter become a leading out-of-phase component and increase with decreasing load, reaching a maximum for zero torque at synchronous speed. Under these conditions the leading out-of-phase current component taken by the motor at no-load will be excessive, particularly so if the machine is designed with an air-gap having a length of the order of magnitude usual in non-synchronous induction motors of corresponding size. One object of my invention is to make it possible to operate synchronous motors with constant unidirectional excitation on the secondary from zero torque to maximum synchronous torque without causing the machine to take an unduly large leading current component at no-load and at fractional loads and without reducing the maximum synchronous torque of the machine. In some cases I may make use of my invention in conjunction with means for adjusting the magnitude of the unidirectional magnetization on the secondary, utilizing my invention for the purpose of reducing the necessary range of the adjusting means.

While, theoretically, the axis of the resultant motor magnetization coincides with the axis of the unidirectional secondary magnetization for zero torque conditions, the axis of said resultant motor magnetization is, at maximum synchronous load, displaced by about 90 electrical degrees from the axis of the secondary magnetization. I take advantage of these facts in order to achieve some of the objects of my invention.

Assuming that the secondary ampereturns required at maximum synchronous torque by a certain synchronous motor are three times as great as the ampereturns necessary to produce the resultant motor magnetization in a machine without defined polar projections and offering the same magnetic reluctance along all possible axes, as would be the case if a synchronous motor were built into the magnetic structure of a non-synchronous induction motor, and assuming further that the magnitude of said secondary ampereturns is kept constant while the load is changed from zero to a maximum, then at maximum synchronous torque the primary ampereturns will be some 6% greater than the secondary ampereturns and the primary current will lag about 19 degrees behind the terminal voltage, whereas for zero torque the primary current will lead the terminal voltage by 90 degrees and the primary ampereturns will amount to about two-thirds of the secondary ampereturns, which means that the primary current taken by the machine will vary in the ratio of 66.66 to 106, while the synchronous torque varies from zero to its maximum. To better this condition, I make the magnetic reluctance of the secondary along that axis of said secondary along which the secondary unidirectional magnetization is produced, greater than along another axis displaced by less than 180 degrees from the first. If, for instance, in the machine just discussed, I double the magnetic reluctance of the secondary in the axis of the unidirectional magnetization produced on the secondary and leave said reluctance unchanged in an axis displaced by 90 electrical degrees with respect to that of the secondary magnetization, then, for maximum synchronous torque, the conditions will be exactly as herebefore stated, for the reason that the axis of the resultant motor magnetization is then displaced by 90 electrical degrees from the axis of the secondary "exciting" winding and therefore coincides with that axis of the secondary along which the magnetic reluctance has remained unchanged. But, for zero torque, the axis of the resultant motor magnetization coincides with that of the secondary "exciting" winding and, therefore, lies along that axis of the secondary along which the magnetic reluctance has been doubled. For this reason the ampereturns necessary to produce the resultant no-load magnetization must be doubled, even though said magnetization remains practically constant. Under these conditions the primary ampereturns for zero torque must be reduced from two-thirds to one-third of the total secondary ampereturns, thus reducing the leading out-of-phase component taken by the machine at zero torque by one-half. With a secondary presenting different magnetic reluctances along axes displaced by less than 180 electrical degrees, and preferably by about 90 electrical degrees, in which the axis of the unidirectional magnetization produced on the secondary does not coincide with that axis of the secondary along which the magnetic reluctance is a minimum, it is possible, among other things, to reduce or control the out-of-phase current component taken by the machine under varying load conditions. If, in the example chosen, I had left the magnetic reluctance of the secondary along one axis per pole pair unchanged and increased the magnetic reluctance of said member along another axis per pole pair to three times its original value, then the current taken by the primary for zero torque could, theoretically, be reduced to zero while the operating conditions of the machine for maximum torque remained unchanged.

The secondary can be made asymmetrical in so far as magnetic reluctance is concerned in a number of ways, some of which I have illustrated and described.

The objects and features of this invention will more fully and clearly appear from the description taken in conjunction with the accompanying drawings and will be pointed out in the claims.

In the accompanying drawings.

Figure 1:
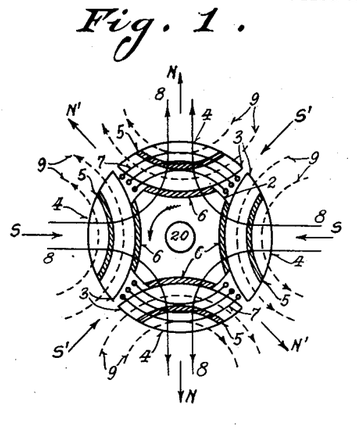
Figs. 1, 2, 3, and 4 show four modifications of my invention as applied to a revolving secondary of a synchronous motor.

Referring to Fig. 1 which shows a four-pole revolving secondary member adapted for use in a synchronous dynamo electric machine, the magnetic material is so sub-divided by means of strips of non-magnetic material as to form a structure which offers very different magnetic reluctances along two axes per pole pair displaced by 90 electrical degrees while retaining the general appearance of the rotor of a non-synchronous induction motor and presenting a practically uniform surface to the air-gap between it and the stationary member. Mounted on the shaft 20 is a body 2 of magnetic material and cylindrical shape from which four segments have been cut away at points displaced by 90 degrees one from the other. Segments 3, also of magnetic material, are shaped to fit the cut-away portions of the body 2 with the interposition of relatively thin segments of non-magnetic material 6. The segments 3 project well beyond the periphery of the body 2. Other and lens-shaped elements of magnetic material 4 are so formed that one of their surfaces fits into the segments 3 with the interposition of relatively thin segments 5 of non-magnetic material while the other of their surfaces, together with the ends of the segments 3, form the outer periphery of the revolving member. The segments 3 do not touch each other along the periphedy of the revolving member, thus leaving four gaps or interruptions in the continuity of said periphery. These gaps give access to an approximately triangular space left between the body 2 and adjacent segments 3. The winding 7 adapted to produce the unidirectional magnetization on the secondary member shown in Fig. 1 is located in said triangular spaces or slots and connected to a suitable source of electrical energy. This winding 7 produces a four-pole magnetization designated in the figure by N, S, N, S. The course taken by the magnetic lines composing the unidirectional magnetization produced by 7 is indicated by the thin lines 8 and it is seen that each of these lines threads the lens-shaped elements 4 as well as the segments 3 transversely and also threads each of the non-magnetic elements 5 and 6, separating the magnetic elements 2, 3 and 4. The non-magnetic elements interrupt the continuity of the magnetic material and thus virtually form additional air-gaps in the path of the magnetic lines 8. Because they are non-magnetic, the elements in question can be omitted without affecting the reluctance in the path of the magnetic lines 8, but when the air-gaps which they are to produce are of very short length then it is mechanically preferable to use these segments of non-magnetic material. The secondary member shown in Fig. 1 offers a totally different and much lower magnetic reluctance to any magnetic flux 9 displaced by 90 electrical degrees from the flux 8. In a four-pole machine 90 electrical degrees corresponds to 45 mechanical degrees and it is seen that the flux represented by the dotted lines 9 and producing the poles N', S', N', S' threads my improved secondary member without encountering any considerable reluctance since it threads the magnetic elements 3 and 4 longitudinally as is seen in the figure.

In making use of the secondary member shown in Fig. 1, for instance in a synchronous motor, the resultant flux or magnetization of the machine at zero torque will practically coincide with the magnetization N, S, N, S, produced by 7 and a relatively large number of ampereturns will be required to produce this constant resultant flux. But, under maximum synchronous torque conditions the axis of the resultant motor magnetization will coincide with that of the magnetization N', S', N', S' of Fig. 1, or nearly so, and the ampereturns necessary to produce the constant resultant flux of the machine under maximum synchronous torque conditions will be very greatly reduced, thus achieving one of the main objects of my invention. Still referring to a synchronous motor and assuming that the secondary member thereof revolves counterclockwise, then the axis of the resultant motor magnetization will move counter-clockwise with respect to the secondary when the load on the motor increases, moving from its theoretical no-torque position N towards its theoretical maximum synchronous torque position N'. No primary member is shown in connection with the secondary illustrated in Fig. 1 for the reason that the secondary member embodying my invention is adapted for operation with a primary of the usual construction. No means have been shown for holding the elements 3 and 4 to the body 2, for the reason that a number of suitable means such, for instance, as radially located bolts, can be used and form no part of my present invention. The elements 2, 3, and 4 may be laminated or not, as well understood requirements determine.

Figures 2, 3, 4, 5:
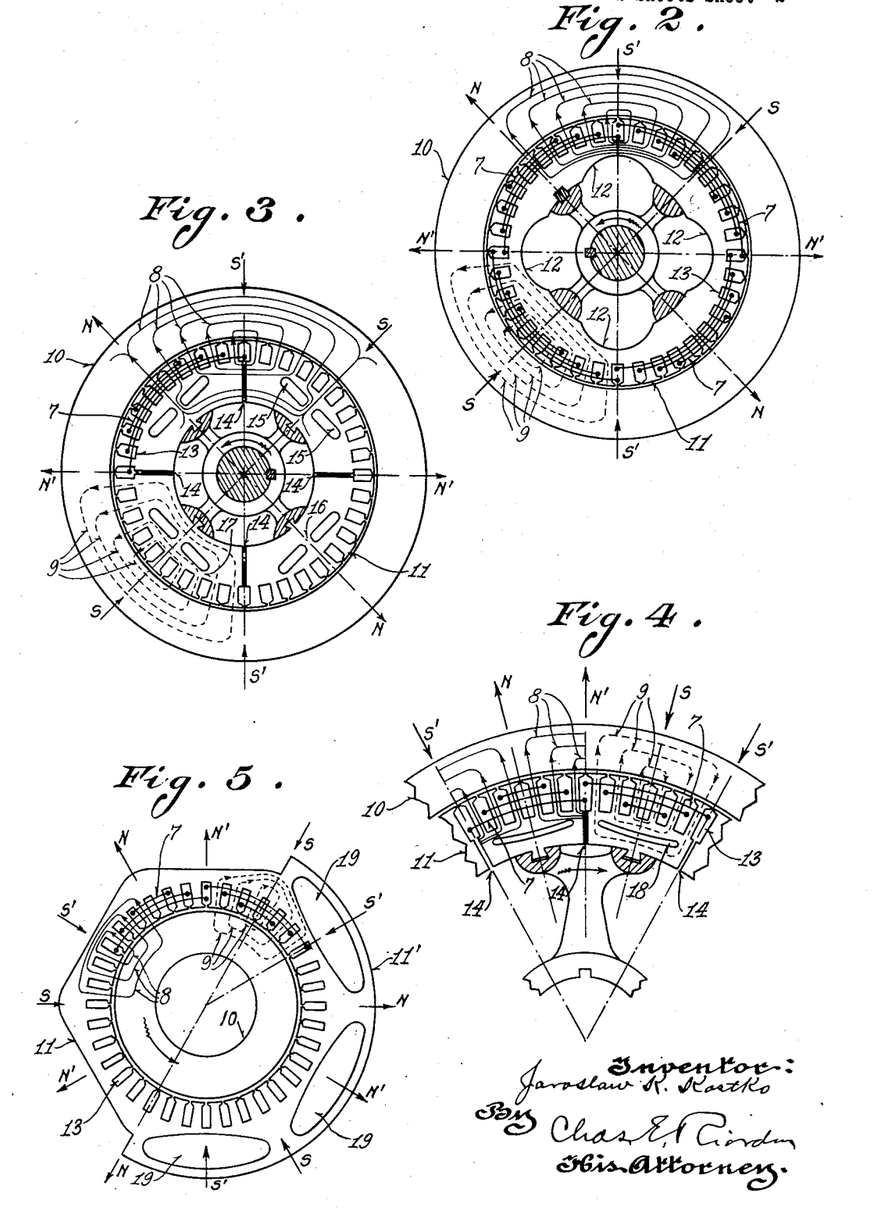
Fig. 5 shows two forms of the invention as applied to a stationary secondary.

Referring to Fig. 2, this also illustrates a four-pole secondary 11 without defined polar projections and located within a primary diagrammatically indicated at 10. The secondary is provided on its periphery with 36 slots 13 such as used, for instance, in connection with asynchronous induction motors and the winding 7 adapted to produce the unidirectional magnetization on the secondary is located in said slots in the manner indicated in the figure. The magnetic reluctance of this secondary is made asymmetric by cutting away parts of the magnetic material behind the slots in the manner shown at 12. The distribution of the unidirectional magnetization N, S, N, S, produced by the winding 7 is indicated in the figure by the full thin lines 8 for half a north and half a south pole and it is seen that all of said magnetization must crowd through that part of the magnetic material located behind the slots 13 which is materially reduced by the cutting out of a portion of said material as indicated at 12. The course taken by a magnetization N', S', N', S' displaced by 90 electrical degrees from the magnetization N, S, N, S, is indicated for half a north and half a south pole by the dotted lines 9 and it is seen that the maximum cross section of magnetic material available on the secondary behind the slots 13 is available for the flux 9. The magnetic reluctance of the secondary is, therefore, considerably smaller in the axis of the magnetization N', S', N', S', than it is in the axis of the magnetization N, S, N, S, displaced by 90 electrical, here 45 mechanical, degrees from the former.

If the structure shown in Fig. 2 is used in connection with a synchronous motor the resultant magnetization of the machine for zero torque will approximately coincide with the axis of the magnetization N, S, N, S, and a certain number of ampereturns will be necessary to produce said resultant magnetization under the conditions named. If the secondary revolves counter-clockwise as indicated, then the resultant motor magnetization, which remains practically constant throughout the operation of the machine so long as the terminal voltage remains constant, will move with respect to the secondary in the direction of rotation of said secondary. At maximum synchronous torque it will be displaced about 90 electrical degrees from its zero torque position, as indicated by the dotted lines 9, and will then encounter the minimum magnetic reluctance of the secondary with the result that a much smaller number of ampereturns will be necessary to produce this practically constant resultant motor magnetization.

The structure of Fig. 2 approaches very closely the structure usual in connection with asynchronous induction motors and a synchronous machine using the structure shown in Fig. 2 can very readily be started like an ordinary asynchronous induction motor and brought up to nearly synchronous speed in that manner. When so operating the magnetizing current taken by the machine will undergo fluctuations according to the position of the revolving field of the asynchronous induction motor with respect to the secondary. This magnetizing current will be a maximum when the axis of the revolving field coincides with the axis of the winding 7 or generally with that of the magnetization N, S, N, S, and will be a minimum when the axis of the revolving field of the motor, revolving synchronously with respect to 10, coincides with an axis displaced by about 90 electrical degrees with respect to N, S, N, S. The said fluctuations are, however, greatly attenuated during the starting period because of the fact that the revolving flux threading the secondary at starting is usually less than normal with the result that the magnetic densities in the reduced cross sections of the secondary are considerably less during said period and do not require a materially greater number of ampereturns than the remaining cross sections of the secondary.

Referring to Fig. 3 which shows another way of making the magnetic reluctance of the secondary different along different axes per pole pair, the secondary 11 is provided with a number of slots 13 distributed along its airgap periphery in a manner usual in non-synchronous induction motors and cooperates with the diagrammatically indicated primary 10 which can be of any suitable construction. In order to make the magnetic reluctance of the four-pole secondary of Fig. 3 along one axis per pole pair different from its magnetic reluctance along another axis per pole pair, the magnetic material behind the slots is divided into four sections separated by the air-gaps shown at 14 and which can, if desired, be filled with non-magnetic material. Furthermore, four groups of openings 15 are provided behind the slots 13. There are two openings per group and the openings in each group are separated by a narrow bridge 16 of magnetic material. Furthermore, these groups of openings 15 are located mid-way between the gaps 14 and in such manner as to cooperate with said gaps to increase the magnetic reluctance of the secondary along one axis per pole pair without materially affecting the reluctance of the secondary along another axis per pole pair which is here displaced by 90 electrical degrees from the former. The winding 7, shown for one pole only of the secondary 11, produces a magnetization N, S, N, S, which closes approximately as indicated by the thin full lines 8 for half a north and half a south pole and it is seen that all of the flux produced by 7 must pass through the gaps 14 and in addition must thread the restricted cross section of magnetic material 16 between each group of two openings 15 are the restricted cross sections 17 of magnetic material located between the outer ends of the openings 15 and the bottom of some of the slots 13. A flux N', S', N', S' appearing along an axis displaced by about 90 electrical degrees from that of 7 closes through a path of much lower magnetic reluctance as indicated by the dotted lines 9 for half a north and half a south pole. It will, of course, be understood that the flux lines 8 and 9 in this, as in all other figures, merely indicate in a diagrammatic manner, possible paths for the magnetic fluxes which they represent, but these lines form a sufficiently accurate representation of the actual conditions to convey the necessary information to one skilled in this art.

Fig. 4 shows a part of a twelve-pole secondary which is self-explanatory after what has been said in connection with the preceding figures and particularly in connection with Fig. 3. The embodiment shown in Fig. 4 differs from that shown in Fig. 3, mainly in that the groups of openings 15, composed in Fig. 3 of two openings separated by a bridge 16, are replaced by single openings 18 shaped somewhat differently from the openings 15 of Fig. 3 but accomplishing practically the same result as indicated in Fig. 4 by the flux lines 8 and 9.

Fig. 5 shows two forms of stationary secondary member. One half of the stationary member, that marked 11, shows one form and the other half, that marked 11', shows the second form. In Fig. 5 the primary 10 is the revolving member and is located within the stationary secondary. Here again, it is indicated diagrammatically only. The structure shown in Fig. 5 is a six-pole machine. In one of its forms, that shown at 11, the inner periphery of the secondary, that which faces the air-gap between it and the primary is uniform to the same extent as is usual in asynchronous induction motors. But, the outer periphery of the secondary 11 is practically hexagonal in shape, the corners of the hexagon being shown rounded. This construction results in a constriction of the available cross section of magnetic material behind the slots 13 along one axis per pole pair and in an absence of such constriction along another axis per pole pair, the two axes, in this case, being displaced by 90 electrical or 30 mechanical degrees. The "exciting" winding 7 is so located that all of the flux which it produces must thread the restricted portion of magnetic material located behind the slots 13. This is diagrammatically indicated by the thin full lines 8 for half a north and half a south pole. The cross section behind the slots 13 available for a flux displaced by about 90 electrical degrees from that coaxial with 7 is diagrammatically indicated by the thin dotted lines 9 for half a north and half a south pole and it is thus seen that the magnetic reluctance of the secondary for a flux N, S, N, S, N, S, coaxial with the axis of 7 is considerably greater than the magnetic reluctance for a flux N', S', N', S', N', S' displaced by about 90 electrical degrees from the former. Practically the same result is obtained by the construction of the secondary indicated in Fig. 5 at 11'. In this case the outer periphery of the secondary member is circular but openings 19, six in a six-pole secondary, are so shaped and located as to make the magnetic reluctance of the secondary along one axis per pole pair considerably greater than its magnetic reluctance along another axis per pole pair. In this case part of the magnetic flux produced by 7 must close between the openings 19 and the back of the slots 13 while another part of said flux must close between the openings 19 and the outer periphery of 11'.

It is seen that for a constant unidirectional magnetization produced by a winding or windings on the secondary of a synchronous dynamo electric machine the maximum decrease of the wattless component of the primary current for zero torque can be secured by displacing the axes of maximum and minimum rotor reluctance by about 90 electrical degrees and by causing the axis of the said unidirectional magnetization on the secondary to coincide with the axis of the higher secondary reluctance, at no-load or at fractional loads. But, it is not necessary that the axes of maximum and minimum reluctance of the secondary be displaced by 90 electrical degrees, nor is it necessary that the axis of the unidirectional magnetization produced on the secondary coincide at or near no-load with the axis of the higher reluctance on the secondary. By varying the displacement of the axes of maximum and minimum reluctance and by varying the location of the no-load axis of the unidirectional magnetization produced on the secondary with respect to said axes the magnitude of the wattless current component for varying loads on the dynamo electric machine can be influenced in a number of different ways some of which may be of advantage in one case and some in another, but, in order to secure at least a part of the advantages attaching to my invention it is necessary that the axis of the unidirectional magnetization produced on the secondary be displaced, at or near no-load, from the axis of the lower magnetic reluctance of my secondary member with asymmetrical reluctance.

It is now well known that the secondary of a synchronous motor can be constituted in a number of different ways and that the secondary ampereturns can be produced by a single or by a plurality of secondary windings. This winding or windings can be connected to the same unidirectional voltage, or a plurality of secondary windings can be connected to more than one unidirectional voltage. My invention is applicable to any of these forms of synchronous dynamo electric machines.

However the primary and the secondary ampereturns are produced in a machine running at synchronous speed, the magnitude of their resultant and its location with respect to the magnetic circuit of the machine determine the magnitude and location of the resultant flux of the machine.

When the magnetic reluctance of the magnetic circuit is substantially the same in all directions, as is the case in a standard non-synchronous induction motor, then the axis of the resultant flux coincides substantially with the axis of the resultant ampereturns. When the machine is such that the resultant flux must remain constant then the primary and secondary ampereturns so adjust themselves that the resultant ampereturns suffice to produce the necessary resultant flux. Failing such adjustment the resultant flux may vary in magnitude but its axis will still practically coincide with the axis of the resultant ampereturns.

Figure 9:
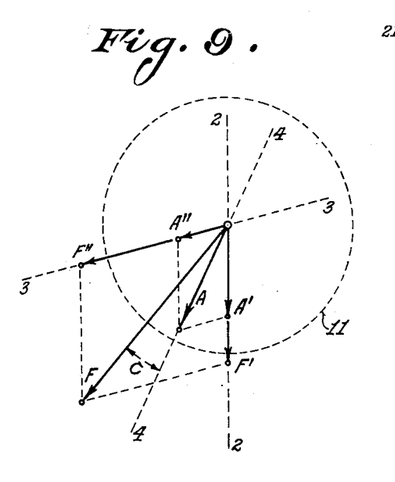
Fig. 9 is an explanatory diagram.

When the magnetic reluctance of the magnetic circuit of the machine is asymmetrical, then the axis of the resultant flux need not substantially coincide with the axis of the resultant ampereturns, as can be seen by reference to the explanatory diagram of Fig. 9. To illustrate this point it is assumed, by way of example, that the magnetic reluctance of the secondary along an axis 2, 2 differs from its magnetic reluctance along an axis 3, 3, that 3, 3 is displaced by some convenient angle from 2, 2 and that the ratio between said reluctances is as $2/3$ to $1/3$. Under some operating condition let the axis of the resultant ampereturns A be 4, 4. These resultant ampereturns can be resolved into a component A' acting along the axis 2, 2 and into a component A'' acting along the axis 3, 3. The fluxes F' and F'' in these two axes must be proportional to the ampereturns and inversely proportional to the reluctances along said axes with the result that the resultant flux F is displaced from the resultant ampereturns A by the angle C and that the magnitude of F is determined in part by the low and in part by the high reluctance of the secondary. It is seen that as the axis 4, 4 moves from 2, 2 to 3, 3 the reluctance offered by the secondary member to the passage of the resultant magnetic flux of the machine decreases.

My invention is equally applicable to self and to separately excited synchronous dynamo electric machines and whether the excitation is derived from a source of direct current or from a source which supplies to the secondary a voltage or voltages of slip frequency which become unidirectional at synchronous speed of the dynamo electric machine.

Figure 6:
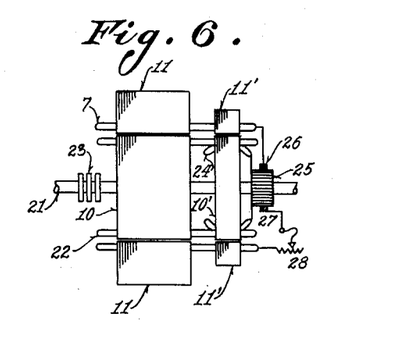
Figs. 6 and 7 are two views of a synchronous motor directly coupled to an exciter embodying my invention, certain windings being common to both machines.
Figure 7:
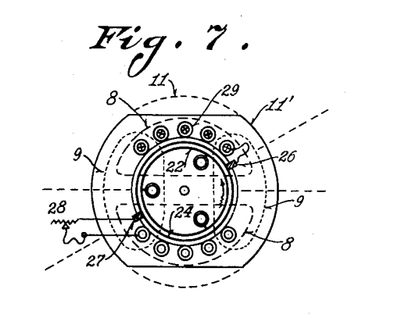

Thus, in Figs. 6 and 7 is shown a two-pole synchronous motor and a two-pole "exciter" therefor. Mounted on the shaft 21 are two axially displaced groups of laminations, a main group 10 and an auxiliary group 10'. The revolving member of this machine is the primary. A primary three-phase winding 22 embraces both groups of rotor laminations and is adapted for connection to the supply by way of the sliprings 23. The auxiliary group of laminations 10' also carries a commuted winding 24 connected to the commutator 25 with which cooperate the stationary brushes 26, 27. This commutator is not shown in Fig. 7 which is an end view of Fig. 6 and where the brushes 26, 27 rest directly on the commuted winding. Stationary groups of laminations 11 and 11' are disposed to cooperate with the revolving groups of laminations 10 and 10' and carry an "exciting" winding 7 located in the slots 29 and connected to the brushes 26, 27 with the interposition of the adjustable resistance 28. The group of laminations 11 is of the configuration usual in secondary members of synchronous induction motors but the group 11' forms an asymmetrical secondary, parts of the laminations behind the slots 29 being cut away, as shown in Fig. 7, to produce a higher magnetic reluctance through the secondary 11' in the axis of the winding 7 located in the slots 29. The current distribution in the slots 29 is indicated by crosses and dots in the usual way. It is assumed that the primary revolves counterclockwise, as shown in Fig. 7, and the axis of the brushes 26, 27 is displaced from the axis of 7 in the direction of rotation of the primary.

Figs. 6 and 7 may be looked upon as representing two synchronous motors mounted on a single shaft with their primary and secondary windings connected in series, the smaller motor 10', 11' being "self-excited" and also acting as an "exciter" for the larger motor. The mode of operation is readily understood when each motor is considered separately. The motor 10', 11'' with the brushes set as shown in Fig. 7 and with a secondary having the same reluctance along all axes, would operate in a now well understood manner the brush voltage increasing with increasing motor load and thus causing the unidirectional magnetization on the secondary to increase with increasing load. Just how this magnetization increases depends, as is now also well known, on the location of the brush axis with respect to the axis of the secondary winding 7. The secondary of the motor 10, 11 would, under said circumstances, receive an "exciting" current increasing with the load in the same proportion as the "exciting" current sent into the secondary of the motor 10', 11'' and both machines would have practically the same compound characteristic. Similar results can be secured by connecting the primaries of the two motors shown in Figs. 6 and 7, in parallel. Nor would anything be changed if the secondary windings of these machines were connected in parallel instead of in series as in Figs. 6 and 7. The armature reaction due to the current in 24 is disregarded throughout as being often small and therefore of little consequence as against the ampereturns in 7 and in 22.

Suppose that the primaries 22 of these two machines are connected in parallel and the secondary magnetic circuit of 10', 11' is made asymmetric as shown in Figs. 6 and 7. The magnitude of the resultant magnetization of each machine must remain practically constant because the terminal voltage is constant. The operation of the machine 10, 11 is unaltered but the out-of-phase component of the primary current of the machine 10', 11', if leading, is reduced at no-load and at fractional loads provided the magnetic reluctance of 11' in the axis of the secondary winding 7 is increased, as against the magnetic reluctance of 11' along an axis displaced from that of 7.

But, if the primaries of the two machines 10, 11 and 10', 11' are connected in series and the secondary 11' is made asymmetrical as to reluctance, then the resultant magnetization of 10', 11' will not be constant but will vary. In Figs. 6 and 7 this resultant magnetization is determined by the vectorial sum of the ampereturns due to 7 and to 22 and by the location of the axis of said vectorial sum or resultant with respect to the axis of lowest magnetic reluctance of 11'. The change in magnitude of the resultant magnetization of 10', 11' and the position of its axis with respect to the axis of the brushes 26, 27 determines the magnitude of the "exciting" voltage and the manner of its variation with the load. Making the secondary of 10', 11' asymmetrical when the primaries of the two machines shown in Figs. 6 and 7 are connected in series gives additional means for controlling the power-factor-load characteristic of the aggregate. To increase the "exciting" voltage with increasing motor load, the axis of lowest magnetic reluctance of 11' must be so located that the axis of the resulting magnetization of 10', 11' approaches it with increasing load on the motor. As a result these two axes will approach each other as the "excitation" and therefore as the exciting watt output or load on the "exciter" itself increases. Changes in load bring about momentary departures of the speed from the synchronous and cause a relative movement between the axis of the resultant magnetization in 10, 11 and in 10', 11' and a fixed axis of the secondary 11 or the secondary 11', for instance the axis of the "exciting" winding 7. When the primary revolves, as in Figs. 5, 6 and 7, an increases in load causes the axis of the resultant magnetization to move away from said fixed axis on the secondary in a direction opposed to that in which the primary revolves. When the secondary revolves as in Figs. 1, 2, 3 and 4, an increase in load causes the said fixed axis to move away from the resultant against the direction of rotation of the secondary. The result is, of course, the same.

In Figs. 6 and 7 the machine 10', 11' acts in part as a self-excited synchronous motor and in part as an exciter for the larger machine 10, 11. If the winding 7 is confined to 11 and omitted from 11' but the asymmetry of the magnetic circuit of 10', 11' retained then the function of 10', 11' is reduced to that of an exciter only, the action of which is modified by the asymmetrical reluctance of the secondary. It is not necessary that all the turns of the windings 7 and 22 embrace both groups of laminations. Some of these turns may embrace only the main group 10, 11, while some others may embrace only the auxiliary group 10', 11'.

Figure 8:
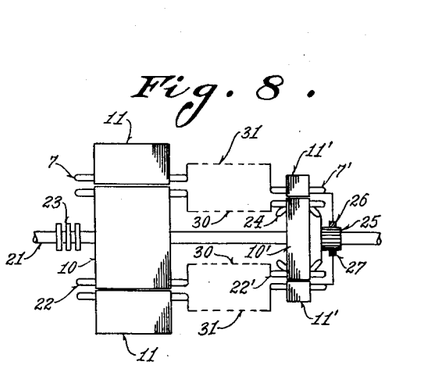
Fig. 8 is a synchronous motor driving an otherwise independent exciter which embodies my invention.

The mechanical arrangement of Figs. 6 and 7 is convenient in that both groups of laminations can be located close to one another. But it will often be found mechanically preferable to adopt the ordinary arrangement of separately excited synchronous machine, i. e., to generate the exciting current in a separate exciter whose shaft is either an extension of the shaft of the main machine, or is positively driven by it. The embodiment with a common shaft is shown in Fig. 8. The primary polyphase winding 22 and the exciting winding 7 are confined to the main machine 10, 11; the primary polyphase winding 22' and the exciting winding 7' are on the exciter 10', 11' only, and the connection is made by means of leads 30 and 31. It is not even necessary that both primaries, or both secondaries, be stationary with respect to each other; for instance, the primary of the main machine may be on the stator 11, while the primary of the exciter may be on the rotor 10'; the connection between these members will then be made by means of slip-rings and brushes.

The mechanical arrangement of a separate exciter, as shown in Fig. 3, not only permits the ratio of turns of the windings 22 and 22', or that of the windings 7 and 7', to be selected at will or to be adjusted, but also gives the designer control over the angular displacement between 22 and 22', or between 7 and 7', thus making it possible to modify the characteristics of the machine within wide limits.

When the primaries of the two machines are connected in series it is immaterial whether the connection is made conductively, on inductively by means of transformers, nor need the two machines have the same numer of poles. If the smaller machine is built for a smaller number of poles than the large one, then it must be driven by the larger one at a correspondingly greater speed whether it carries a unidirectional "exciting" winding 7 or not. If it does carry an "exciting" winding then it is immaterial whether said winding is connected in series or in parallel to the corresponding winding on the secondary of the larger machine.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:—

1. The method of operating a dynamo electric machine which carries variable load at synchronous speed and which has a primary and a secondary member, comprising, causing the magnetic reluctance offered by the secondary member to the passage of the resultant magnetic flux of the machine to decrease with increasing load on the machine.

2. The method of operating a dynamo electric machine which carries variable load at synchronous speed and which has a primary and a secondary member, comprising, producing a resultant magnetization in the machine the axis of which is normally stationary with respect to a fixed axis of the secondary member, causing momentary departures of the speed from the synchronous to change the angular relation between the fixed axis on the secondary and the axis of the resultant flux, and causing the magnetic reluctance offered by the secondary to the passage of the resultant magnetic flux of the machine to decrease whenever the secondary member is momentarily retarded with respect to the primary.

3. The method of operating a dynamo electric machine which carries variable load at synchronous speed and has relatively movable primary and secondary members comprising, producing a resultant flux which normally revolves synchronously with respect to the primary and the axis of which is normally fixed with respect to a fixed axis of the secondary, causing the revolving member to momentarily depart from synchronism, causing momentary departures of the revolving member from synchronism to change the angular relation between the fixed axis on the secondary and the axis of the resultant flux, and causing the magnetic reluctance offered by the secondary member to the passage of the resultant magnetic flux of the machine to decrease with increasing current through the primary.

4. A dynamo electric machine which carries variable load at synchronous speed, having a primary and a secondary without defined polar projections, the magnetic reluctance of the secondary along one axis per pole pair being materially different from the magnetic reluctance of said secondary along a second axis per pole pair, and a winding on the secondary adapted to produce an unidirectional magnetization along an axis displaced from that of the lower magnetic reluctance of the secondary.

5. A dynamo electric machine which carries variable load at synchronous speed, having a primary and a secondary, the magnetic reluctance of the secondary along one axis per pole pair being materially different from the magnetic reluctance of said secondary along a second axis per pole pair, and means on the secondary adapted to produce a unidirectional magnetization along an axis displaced from that of the lower magnetic reluctance of the secondary.

6. A dynamo electric machine which carries variable load at synchronous speed, having a primary and a secondary, the magnetic reluctance of the secondary along one axis per pole pair being materially greater than the magnetic reluctance of said secondary along an axis displaced by about 90 electrical degrees from the first, and means on the secondary adapted to produce a unidirectional magnetization the axis of which approximately coincides with that axis of the secondary which offers the greater magnetic reluctance.

7. A dynamo electric machine which carries variable load at synchronous speed, having a primary and a secondary, an air-gap between primary and secondary, said secondary presenting a substantially continuous surface to said air-gap, a plurality of slots per pole located on the secondary and near the air-gap, the magnetic material of the secondary located behind said slots with reference to said air-gap being of a configuration offering a magnetic reluctance which is materially greater along one axis per pole pair than the magnetic reluctance along another axis per pole pair.

8. A dynamo electric machine which carries variable load at synchronous speed, having a secondary with asymmetrical magnetic reluctance, and means on the secondary adapted to produce at or near no-load a unidirectional magnetization the axis of which approximately coincides with that of the highest magnetic reluctance of the secondary.

9. A dynamo electric machine which carries variable load at synchronous speed, having a primary and a secondary without defined polar projections, a winding on the secondary adapted to produce a unidirectional magnetization at synchronism, and air-gaps dividing the magnetic material of the secondary to increase the magnetic reluctance of the secondary along one axis per pole pair without materially increasing the magnetic reluctance of said secondary along another axis per pole pair.

In testimony whereof I affix my signature this 4th day of March, 1927.

JAROSLAW K. KOSTKO.